United States Patent [19]

Meyers et al.

[11] Patent Number: 5,441,749

[45] Date of Patent: Aug. 15, 1995

[54] CHEWING GUM PRODUCTS USING CALCIUM SULFATE

[75] Inventors: Marc A. Meyers, Naperville; Adebisi A. Campbell; Jacara R. Muhammad, both of Chicago, all of Ill.

[73] Assignee: Wm. Wrigley Jr. Company, Chicago, Ill.

[21] Appl. No.: 160,029

[22] Filed: Nov. 30, 1993

[51] Int. Cl.⁶ .............................................. A23G 3/30
[52] U.S. Cl. .................................................... 426/3
[58] Field of Search ............................... 426/3–6, 426/548

[56] References Cited

U.S. PATENT DOCUMENTS

| | | | |
|---|---|---|---|
| 2,305,960 | 12/1942 | Frorer | 426/5 |
| 3,764,672 | 10/1973 | Argoudelis et al. | 424/181 |
| 4,150,113 | 4/1979 | Hoogendoorn et al. | 424/50 |
| 4,178,362 | 12/1979 | Hoogendoorn et al. | 424/48 |
| 4,206,301 | 6/1980 | Yolles | 426/3 |
| 4,242,323 | 12/1980 | Vlock | 424/58 |
| 4,440,790 | 4/1984 | Blackwell et al. | 426/3 |
| 4,456,621 | 6/1984 | Blackwell et al. | 426/3 |
| 4,478,864 | 10/1984 | Blackwell et al. | 426/3 |
| 4,536,396 | 8/1985 | Stephens, Jr. | 426/3 |
| 4,622,233 | 11/1986 | Torres | 426/3 |
| 4,753,790 | 6/1988 | Silva et al. | 424/440 |
| 4,828,845 | 5/1989 | Zamudio-Tena et al. | 426/5 |
| 4,867,989 | 9/1989 | Silva et al. | 426/5 |
| 5,063,046 | 11/1991 | Grollier | 424/52 |
| 5,087,460 | 2/1992 | Cherukuri | 426/5 |
| 5,106,632 | 4/1992 | Wong et al. | 426/3 |

OTHER PUBLICATIONS

"Food Chemicals Codex", 3rd ed., p. 66 (1981).
*Code of Federal Regulations*, Chapter 21 "Food and Drugs," p. 449 (1993) (21 C.F.R. § 184.1230).

*Primary Examiner*—Jeanette Hunter
*Attorney, Agent, or Firm*—Steven P. Shurtz; Willian Brinks Hofer Gilson & Lione

[57] ABSTRACT

Chewing gum compositions made using calcium sulfate as a filler are disclosed. Calcium sulfate is also used as a rolling compound on chewing gum products.

20 Claims, 8 Drawing Sheets

CHEWING GUM PRODUCTS USING CALCIUM SULFATE

BACKGROUND OF THE INVENTION

The present invention relates to chewing gum products. More particularly, the invention relates to the use of calcium sulfate in chewing gum compositions and in a rolling compound for chewing gum products.

Chewing gum compositions often contain a filler or texturizer such as talc or calcium carbonate. The filler or texturizer may be compounded into the chewing gum base, added as a separate ingredient when mixing the chewing gum composition, or both.

Chewing gum products often include a rolling compound, sometimes referred to as a dusting agent. The rolling compound prevents the gum product from sticking to equipment during gum piece configuration operations, such as sheeting and scoring, or wrapping operations or to the wrapper itself. Typical rolling compounds include sugars and alditols, as well as talc and calcium carbonate.

Talc is more expensive than calcium carbonate, but calcium carbonate is unsuitable for use in some gum compositions. Particularly chewing gums with acidulents, such as sour fruit flavored gums, cannot use calcium carbonate as a filler because it reacts with the acid in the gum composition.

It would therefore be desirable to have a filler and rolling compound that is less expensive than talc, as well as a filler that will not react with acids in acid-containing chewing gums.

SUMMARY OF THE INVENTION

It has been found that calcium sulfate can be used as a filler in chewing gum compositions and as a rolling compound for chewing gum products.

In one aspect, the invention is a chewing gum composition comprising about 5% to about 80% gum base; about 5% to about 90% bulking and sweetening agent; about 0.1% to about 10% flavor; about 0.2% to about 6% calcium sulfate; and about 0.2% to about 2.5% of a food grade acidulent.

In a second aspect, the invention is a chewing gum product comprising a gum composition with a rolling compound thereon, the rolling compound comprising calcium sulfate.

In a third aspect, the invention is a method of making a chewing gum composition comprising the steps of providing about 5% to about 80% gum base; about 5% to about 90% bulking and sweetening agent; about 0.1% to about 10% flavor; and about 2.5% to about 6% calcium sulfate; and mixing the gum base, bulking and sweetening agent, flavor and calcium sulfate to make a chewing gum composition.

Calcium sulfate is less expensive than talc, and studies have shown that it does not neutralize acids in chewing gum compositions. In addition, other benefits from the use of calcium sulfate in chewing gum have been discovered, which will be described in more detail hereinafter.

DETAILED DESCRIPTION OF THE PRESENTLY PREFERRED EMBODIMENTS OF THE INVENTION

As used herein, the term chewing gum includes chewing gum, bubble gum and the like. All percents are given in weight percent unless specified otherwise.

Calcium sulfate comes in an anhydrous form and as gypsum, calcium sulfate dihydrate. Calcium sulfate anhydrous is also known as plaster of Paris. Calcium sulfate occurs naturally and exists as a fine, white to slightly yellow-white odorless powder. Its functional uses in foods are generally as a nutrient, dietary supplement, yeast food, dough conditioner, firming agent, polishing agent and sequestrant. The dihydrate form of calcium carbonate, gypsum, is preferred for use in the present invention. Gypsum is available from Allied Custom Gypsum, 113 S. Main, Bessie, Okla. 73622.

Calcium sulfate is sometimes used in food products as a pigment. However, when used as a pigment, it would be expected that calcium sulfate would only be used at levels of less than 300 ppm (0.03%). In the present invention, the calcium sulfate will typically be used at higher levels.

In the preferred embodiments of the invention, the calcium sulfate will have a particle size of less than about 75 microns, and more preferable, an average particle size of about 14 microns.

The calcium sulfate has utility both as an ingredient in a chewing gum composition, and as a rolling compound to be applied to a chewing gum product. In either use, the level of calcium sulfate will preferably be between about 0.2% and about 6%, and more preferably between about 1% and about 4% of the total chewing gum. At levels above about 6%, the calcium sulfate affects the taste of the chewing gum product. Since rolling compounds are typically applied at levels of about 2% to about 5% of the gum product, the rolling compound may be 100% calcium sulfate. However, where other properties are desired in the rolling compound, such as sweetness, other materials such as mannitol, sorbitol, xylitol, starch and sugar may be mixed with the calcium sulfate.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber (isobutylene-isoprene copolymer) and styrene butadiene rubber, as well as natural latexes such as chicle.

Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Paraffin waxes may be considered to be plasticizers. Microcrystalline waxes, especially those with a high degree of crystallinity, may be considered as bodying agents or textural modifiers.

The gum base typically also includes a filler component. As described above, the filler component in the present invention comprises calcium sulfate. The filler may constitute between about 5% and about 60% of the gum base. Preferably, the filler comprises about 5% to about 50% of the gum base. Since the calcium sulfate will be used preferably at levels of between about 0.2% and about 6% of the total gum composition, if additional fillers are desired, other traditional fillers should be used.

Emulsifiers, which sometimes also have plasticizing properties, include glycerol monostearate, lecithin and glycerol triacetate. Further, gum bases may also contain optional ingredients such as antioxidants, colors and flavors.

The insoluble gum base may constitute between about 5% to about 80% of the gum. More typically the insoluble gum base comprises between 10% and 50% of the gum, and most often about 20% to about 35% of the gum. The present invention contemplates employing any commercially acceptable gum base and adding calcium sulfate as a separate filler.

The water-soluble portion of the chewing gum may further comprise sweeteners, softeners, flavoring agents and combinations thereof. The sweeteners often fulfill the roll of bulking agents in the gum. As used herein, the term "bulking and sweetening agent" comprises not only those ingredients that perform both bulking and sweetening functions, but also combinations of ingredients that together perform the functions, such as combinations of low sweetness bulking agents and high-intensity sweeteners.

Sugarless sweeteners include sorbitol, mannitol, xylitol, hydrogenated starch hydrolysates, maltitol and the like, alone or in combination. In sugar gums, typical bulking agents include sucrose, dextrose, maltose, dextrin, dried invert sugar, fructose, levulose, galactose, corn syrup solids and the like, alone or in combination. High-intensity sweeteners include aspartame, alitame, dihydrocalcones, sucralose, cyclamate, saccharin, acesulfame k, glycyrrhizin, thaumatin, monellin, stevioside and the like, alone or in combination. The bulking and sweetening agent generally will comprise from about 5% to about 90% of the gum composition, and more preferably about 20% to about 80% of the gum composition, and most preferably about 30% to about 60% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Where it is desirable to add corn syrup or hydrogenated starch hydrolysate (HSH) syrup to the gum composition without adding all of the water that comes with commercial forms of the syrup, the syrup may be coevaporated with glycerine or equivalent compounds as disclosed in U.S. Pat. No. 4,671,967 (incorporated herein by reference) before it is used to make the gum composition. Such coevaporated syrups typically comprise less than about 10% water and are used at levels between about 3.5% and about 10% of the gum composition.

In the preferred embodiment of the invention, the gum composition will include about 0.2% to about 2.5%, preferably about 0.4% to about 1% of a food grade acidulent. Food grade acidulents include citric acid, fumaric acid, adipic acid, succinic acid, butyric acid, capric acid, tartic acid, malic acid, lactic acid, acetic acid, phosphoric acid, tannic acid and mixtures thereof.

A flavoring agent may be present in the chewing gum in an amount within the range of from about 0.1% to about 10%, preferably from about 0.5% to about 3% of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention. Preferably the food grade acidulent and flavor used will provide a sour fruit flavor to the gum.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chucks or casting into pellets.

Generally, the ingredients are mixed by first melting the gum base and adding it to the running mixer. The base may also be melted in the mixer itself. Color or emulsifiers may also be added at this time. Any syrup is preferably added at this time, along with a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

EXAMPLES 1-5

Examples 1-5 are sugarless, sour fruit flavored chewing gum compositions, containing citric acid, made with 2.5%, 3.0%, 4.0%, 5.0%, and 6.0% gypsum as a filler in the gum. The compositions are given in Table 1 below.

TABLE 1

|  | Ex. 1 | Ex. 2 | Ex. 3 | Ex. 4 | Ex. 5 |
| --- | --- | --- | --- | --- | --- |
| Sorbitol | 51.59 | 51.09 | 50.09 | 49.09 | 48.09 |
| Gum Base | 29.5 | 29.5 | 29.5 | 29.5 | 29.5 |
| Glycerin | 13.5 | 13.5 | 13.5 | 13.5 | 13.5 |
| Flavor | 2.0 | 2.0 | 2.0 | 2.0 | 2.0 |
| Citric Acid | 0.6 | 0.6 | 0.6 | 0.6 | 0.6 |
| Encapsulated Aspartame | 0.31 | 0.31 | 0.31 | 0.31 | 0.31 |
| Gypsum | 2.5 | 3.0 | 4.0 | 5.0 | 6.0. |

Figure 1:
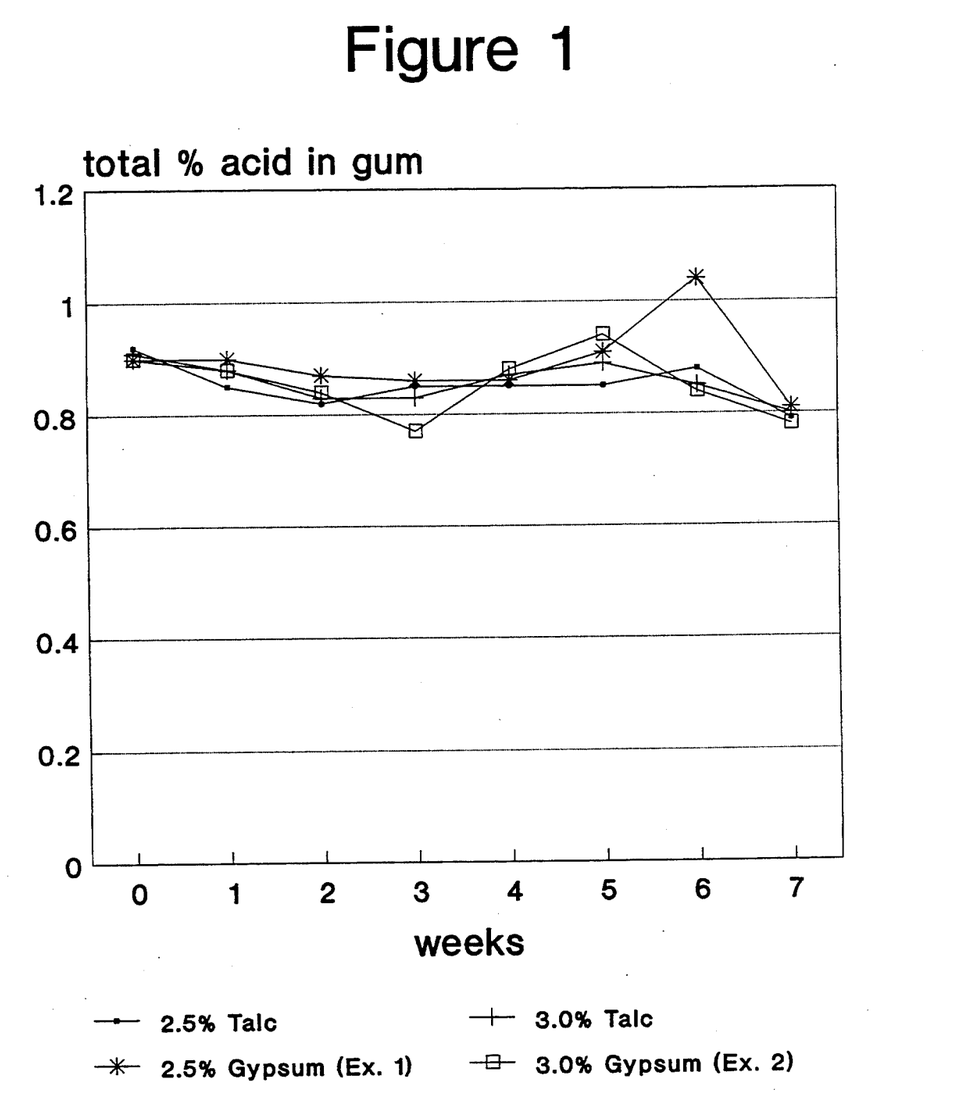
FIGS. 1 and 2 are graphs showing the levels of titratable acid remaining in sour fruit flavor gums over a period of eight weeks of storage, comparing the results of gum formulas with different levels of calcium sulfate to gum formulations with equal levels of talc.
Figure 2:
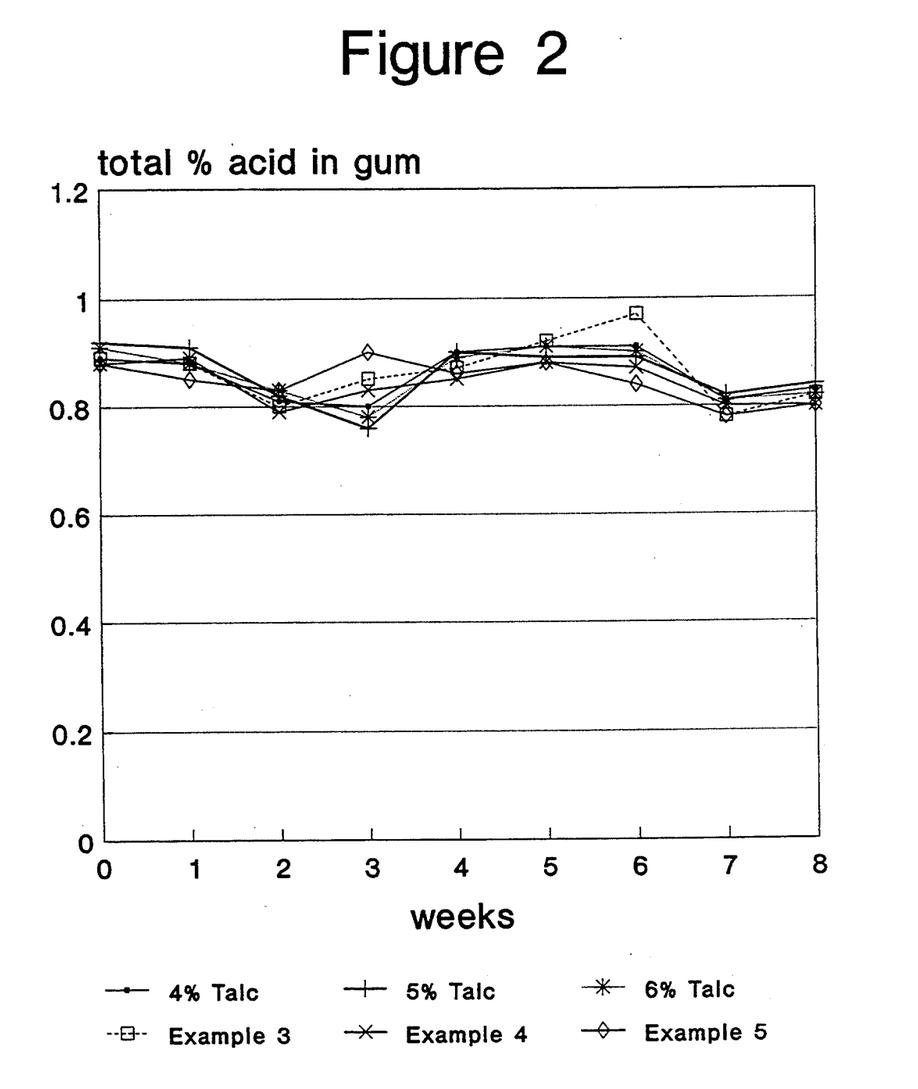

Five chewing gums with talc were also made using the same formulations as Examples 1-5, except that the gypsum was replaced with talc. Samples of each of the 10 gum formulations were then placed in a 85° F., 70% RH humidity cabinet for accelerated aging to compare how the gypsum and talc performed with regard to neutralization of the citric acid in the fruit-flavored gum. Titratable acidity tests were performed by dissolving 8 gram gum samples in a mixture of 25% ml methanol, 25 ml chloroform and 50 ml deionized water and titrating a portion of the resulting aqueous phase with 0.1N sodium hydroxide solution to a pH of 8. The other gum ingredients, primarily the flavor, contributed to the total titratable acid in the gum samples. FIGS. 1 and 2 show the results of the titratable acidity test. These graphs show that the amount of acid remaining in the gum after 8 weeks of accelerated aging was fairly comparable between the gums containing gypsum and gums containing an equal amount of talc. From these results, it can be concluded that the gypsum in the chewing gum did not neutralize the acid in the chewing gum any more than the talc did.

EXAMPLE 6

Gypsum was used as a rolling compound for sugarless chewing gum. Chewing gum was made using the following sugarless peppermint gum formula.

|  | Ex. 6 |
| --- | --- |
| Sorbitol | 49.51 |
| Gum Base | 25.46 |
| Lecithin | 0.21 |
| Mannitol | 7.98 |
| Glycerin | 6.26 |
| Coevaporated Glycerin/HSH Syrup | 9.1 |
| Flavor | 1.44 |
| Aspartame | 0.04 |

The coevaporated glycerin/HSH syrup was made by mixing glycerin and Lycasin brand hydrogenated starch hydrolysate syrup from the Roquette Company, evaporated to a composition of 67.5% HSH solids, 7.5% water and 25% glycerin.

Figure 3:
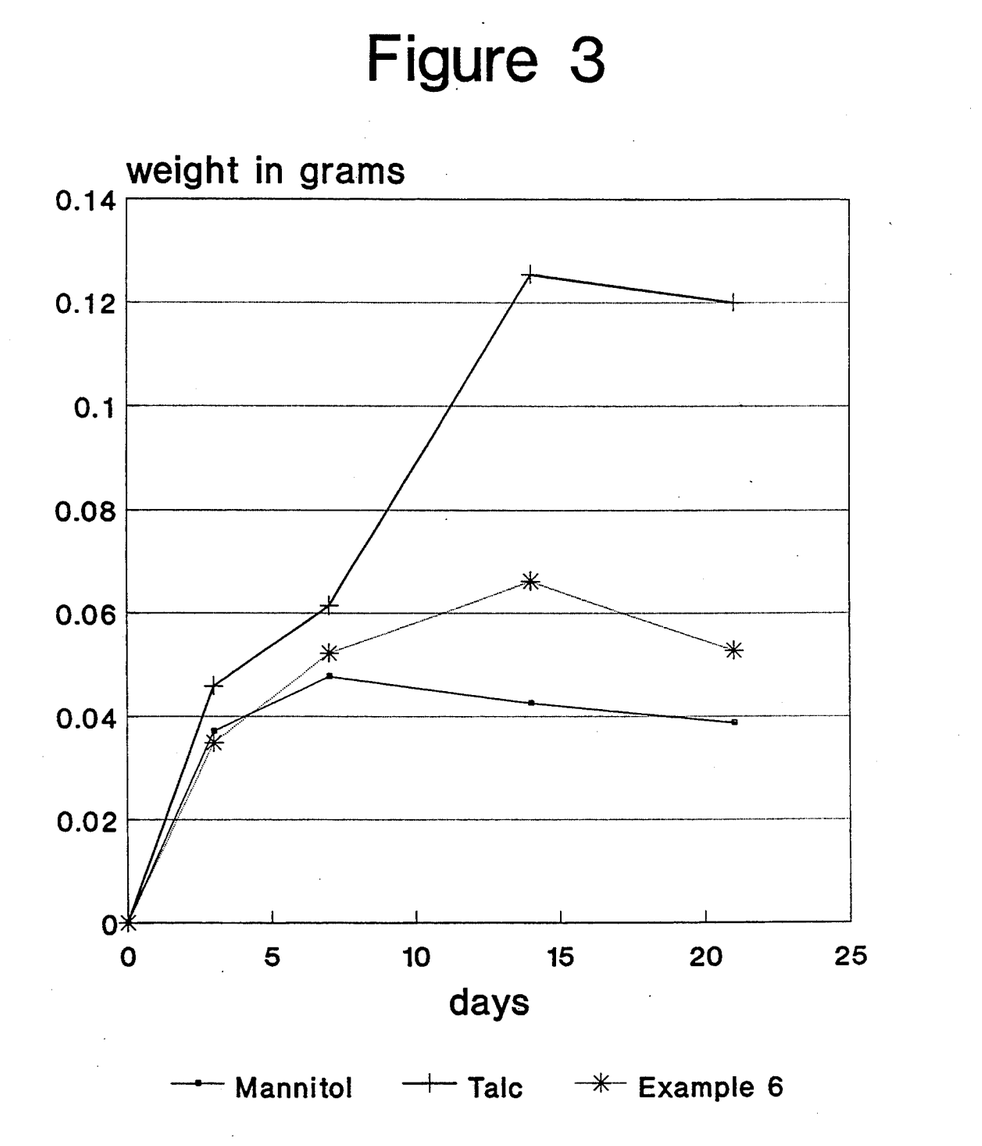
FIGS. 3-8 are graphs showing the results of moisture gain studies conducted at three different relative humidities on chewing gum products using 100% calcium sulfate, 100% mannitol, 100% talc and calcium sulfate mixed at a 1:1 ratio with either mannitol, sorbitol or talc and the mixture used as a rolling compound.
Figure 4:
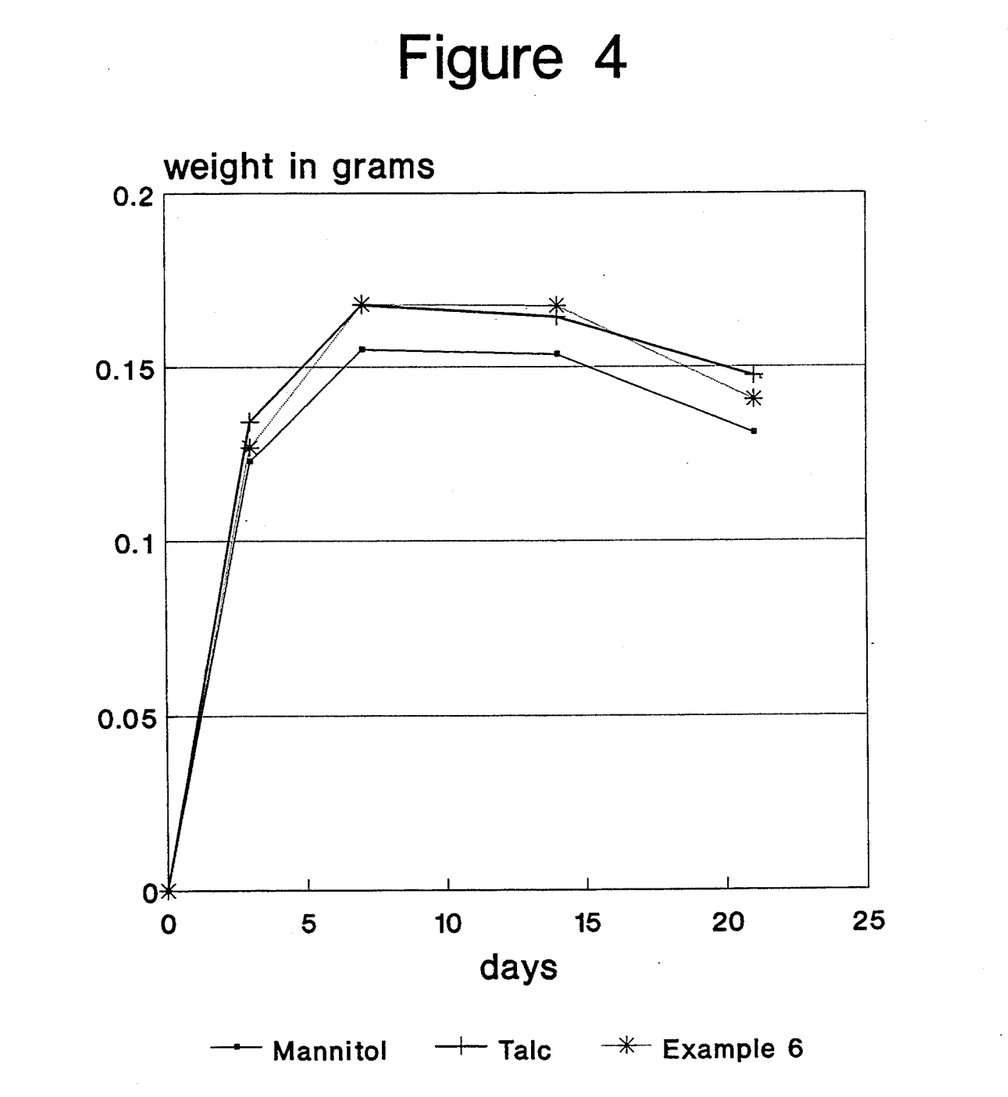
Figure 5:
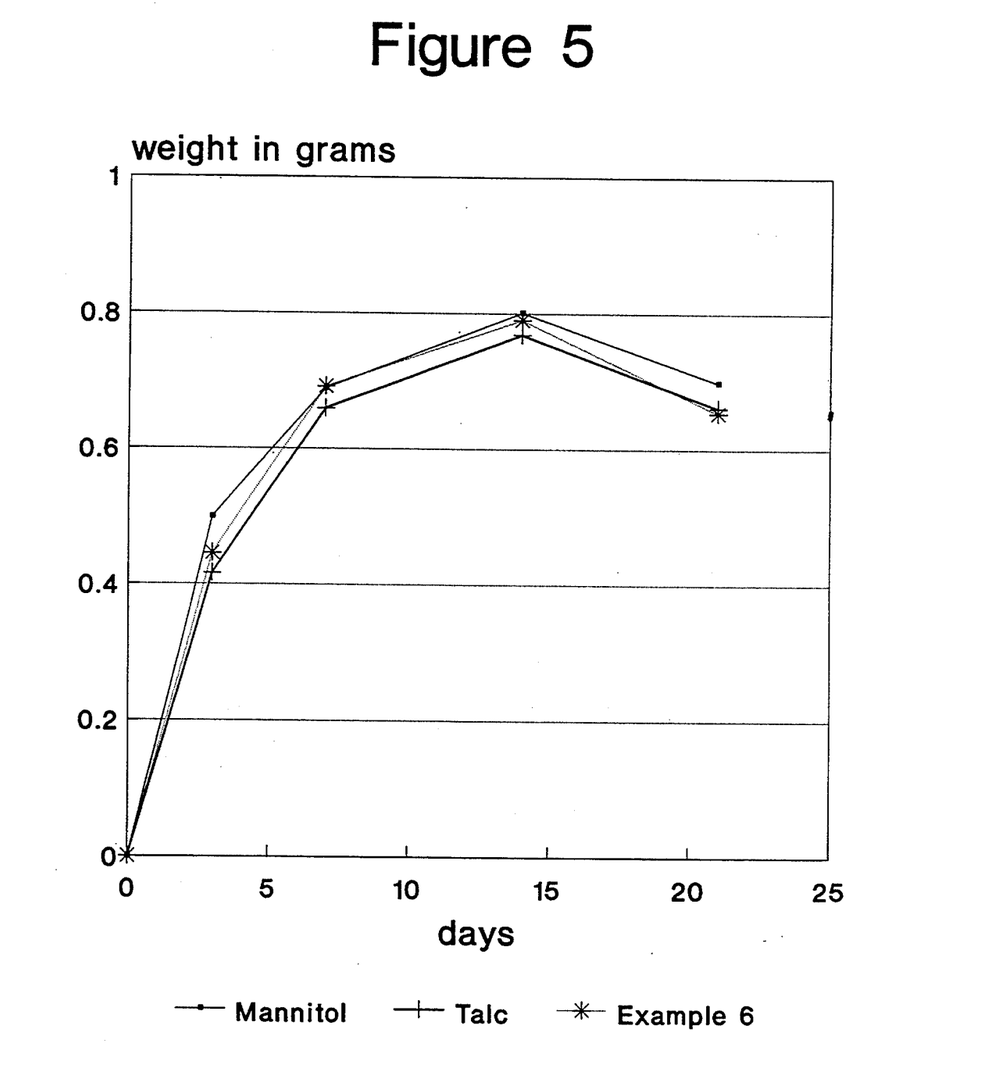

The gum was then dusted with gypsum, probably at a level of about 3-4% of the gum compositions. Two other identical gum compositions were dusted respectively with mannitol and talc. The gum was then sheeted and cut into sticks. A moisture study was performed by placing the chewing gum sticks into desiccators with a 42.3% RH, 58% RH and a 78% RH for 21 days. FIGS. 3-5 show the amount of moisture gained by each sample for the 42.3% RH, 58% RH and 78% RH storage conditions respectively. It can be seen in FIGS. 3-5 that the chewing gum with gypsum as a rolling compound had less moisture gain at 42.3% RH than the gum using talc as a rolling compound, and roughly equal moisture gain at all storage conditions compared to the chewing gum with mannitol as a rolling compound.

Figure 6:
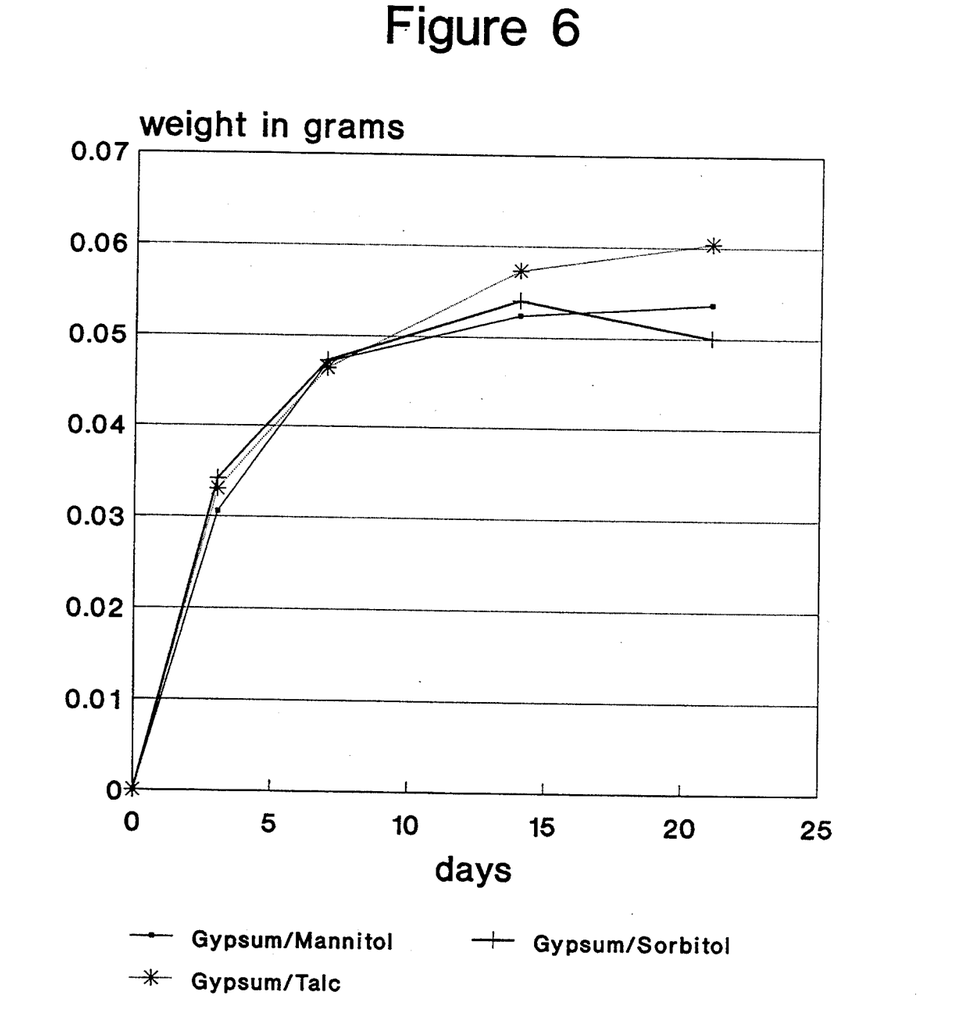
Figure 7:
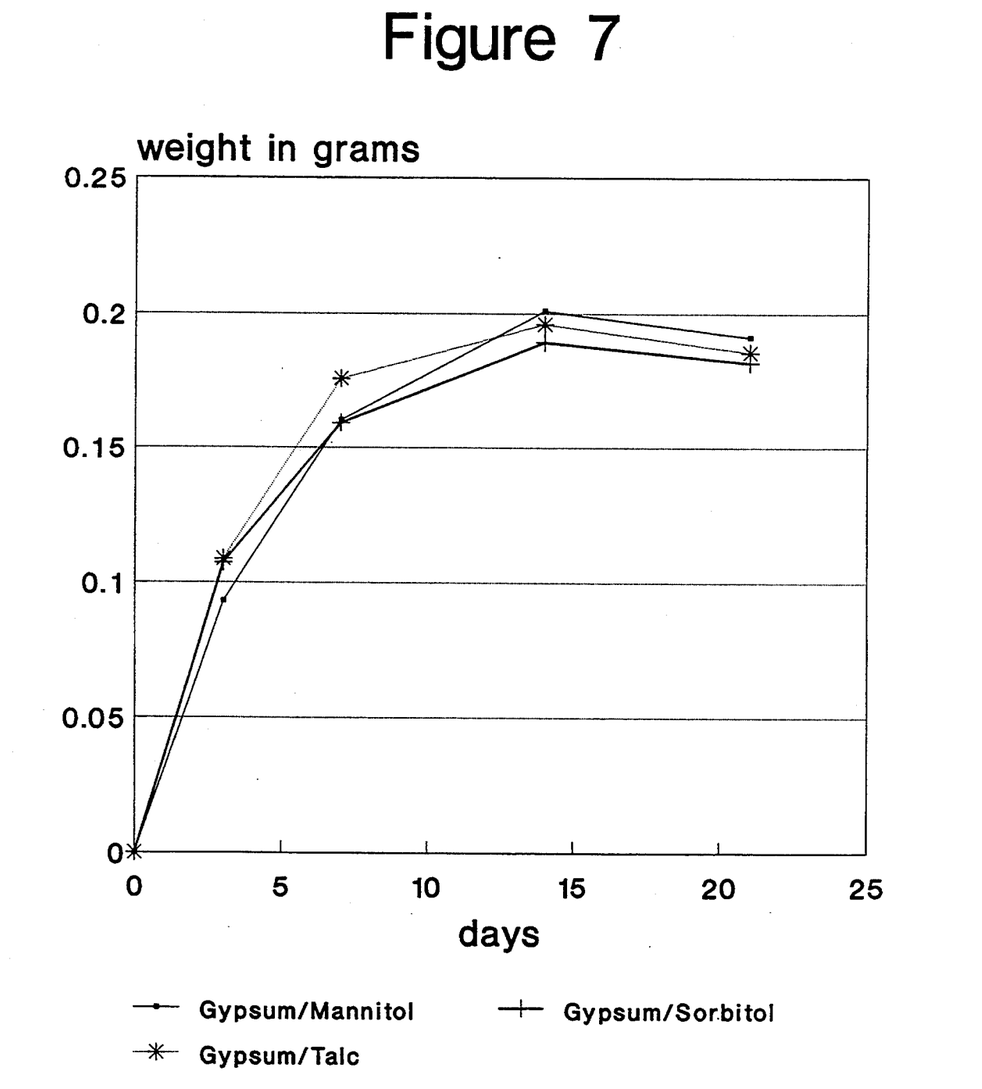
Figure 8:
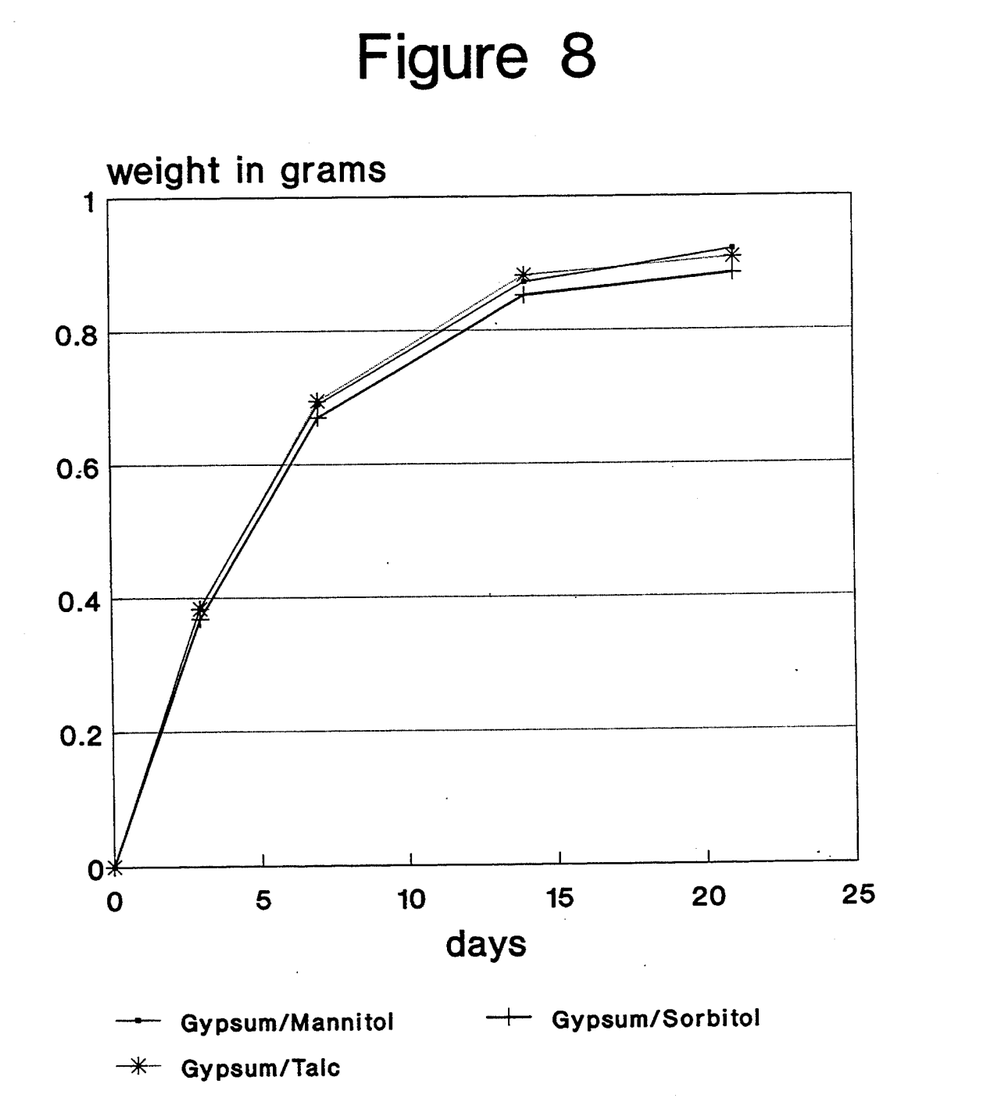

Another batch of sugarless peppermint gum was made using the same gum formula as in Example 6 and separated into 3 parts. Each part was dusted with a specific combination of rolling compounds. The combinations used were 50% mannitol/50% gypsum, 50% sorbitol/50% gypsum and 50% talc/50% gypsum. A moisture study was performed on these gum samples by placing them into desiccators with 42.38 RH, 58% RH and 78% RH for 21 days. FIGS. 6-8 show the amount of moisture gained by each sample for the 42.38 RH, 58% RH and 78% RH conditions, respectively. At each RH level, all the combinations were very close to one another in moisture gain.

Besides the fact that the cost of calcium sulfate is about one-sixth the cost of talc, and that it can be used in gum compositions containing food grade acidulents, other benefits of using calcium sulfate have been discovered. Calcium sulfate is also about 30% less expensive than calcium carbonate, and may therefore be a preferred filler even when the gum composition does not include an acidulent. Also, studies showed improved cohesiveness in the mixer and improved release off of pellitizer rolls when the gum contained calcium sulfate. The presence of calcium sulfate was also found to improve the mixing of evaporated glycerin/HSH syrup into the gum composition.

As noted with respect to Example 6 and FIGS. 3-8, the calcium sulfate dihydrate is useful as a rolling compound that does not attract moisture to the gum. Calcium sulfate anhydrous may act as a desiccant to prevent moisture from the atmosphere from affecting chewing gum products. In addition to, or alternative to, applying the calcium sulfate to the gum, the calcium sulfate may be used inside the packaging material. Using edible film technology, calcium sulfate could be used in a laminate applied to the gum products, or in a spray coating application.

It should be appreciated that the composition and methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A chewing gum composition comprising:
   a) about 5% to about 80% gum base;
   b) about 5% to about 90% bulking and sweetening agent;
   c) about 0.1% to about 10% flavor;
   d) about 0.2% to about 6% calcium sulfate; and
   e) about 0.2% to about 2.5% of a food grade acidulent.

2. The chewing gum composition of claim 1 wherein the calcium sulfate has a particle size of less than about 75 microns.

3. The chewing gum composition of claim 1 wherein the flavor and food grade acidulent provide a sour fruit flavor to the gum composition.

4. The chewing gum composition of claim 1 wherein the calcium sulfate comprises about 1% to about 4% of the gum composition.

5. The chewing gum composition of claim 1 wherein the food grade acidulent comprises citric acid.

6. The chewing gum composition of claim 1 further comprising co-evaporated glycerin and hydrogenated starch hydrolysate syrup.

7. A chewing gum product comprising a gum composition with a rolling compound thereon, the rolling compound comprising calcium sulfate.

8. The chewing gum product of claim 7 wherein the gum composition is a sugarless chewing gum.

9. The chewing gum product of claim 7 wherein the gum composition includes a food grade acidulent.

10. The chewing gum product of claim 7 wherein the calcium sulfate in the rolling compound comprises between about 2% and about 5% of the gum product.

11. The chewing gum product of claim 7 wherein the rolling compound further comprises one or more ingredients selected from the group consisting of mannitol, sorbitol, xylitol, starch and sugar.

12. The chewing gum product of claim 7 wherein the calcium sulfate is in its dihydrate form.

13. A method of making a chewing gum composition comprising:

a) providing about 5% to about 80% gum base, about 5% to about 90% bulking and sweetening agent, about 0.1% to about 10% flavor and about 2.5% to about 6% calcium sulfate; and b) mixing the gum base, bulking and sweetening agent, flavor and calcium sulfate to make a chewing gum composition.

14. The method of claim 13 wherein the calcium sulfate is compounded with the gum base prior to mixing the gum base with the bulking and sweetening agent and flavor.

15. The method of claim 13 wherein the calcium sulfate is mixed into the gum composition as an ingredient separate from the gum base.

16. The method of claim 13 further comprising the step of providing and mixing about 0.2% to about 2.5% of a food grade acidulent into the chewing gum composition.

17. The method of claim 13 wherein the calcium sulfate has a particle size of less than about 75 microns.

18. The method of claim 13 further comprising the step of co-evaporating glycerin and hydrogenated starch hydrolysate syrup to a moisture level of below about 10% and mixing the co-evaporated syrup into the composition at a level of between about 3.5% and about 10% of the gum composition.

19. The method of claim 16 wherein the flavor and food grade acidulent provide the chewing gum composition with a sour fruit flavor.

20. The method of claim 13 wherein the calcium sulfate is provided in its dihydrate form.

* * * * *

UNITED STATES PATENT AND TRADEMARK OFFICE
CERTIFICATE OF CORRECTION

PATENT NO.    : 5,441,749
DATED         : August 15, 1995
INVENTOR(S)   : Meyers et al.

It is certified that error appears in the above-indentified patent and that said Letters Patent is hereby corrected as shown below:

In column 6, line 12, replace "42.38" with --42.3%--.

Signed and Sealed this

Fifteenth Day of June, 1999

Attest:

Q. TODD DICKINSON

*Attesting Officer*        *Acting Commissioner of Patents and Trademarks*